United States Patent
zur Loye et al.

(10) Patent No.: US 9,228,536 B2
(45) Date of Patent: Jan. 5, 2016

(54) LOAD SHEDDING TECHNIQUES FOR DUAL FUEL ENGINES

(71) Applicant: Cummins Inc., Columbus, IL (US)

(72) Inventors: Axel Otto zur Loye, Columbus, IN (US); Timothy P. Lutz, Columbus, IN (US)

(73) Assignee: Cummins Inc., Columbus, IN (US)

( * ) Notice: Subject to any disclaimer, the term of this patent is extended or adjusted under 35 U.S.C. 154(b) by 83 days.

(21) Appl. No.: 14/108,741

(22) Filed: Dec. 17, 2013

(65) Prior Publication Data

US 2015/0167590 A1  Jun. 18, 2015

(51) Int. Cl.
| | |
|---|---|
| *F01N 3/00* | (2006.01) |
| *F01N 3/02* | (2006.01) |
| *F01N 3/10* | (2006.01) |
| *F01N 3/20* | (2006.01) |
| *F02D 19/08* | (2006.01) |
| *F02M 21/02* | (2006.01) |
| *F02D 41/04* | (2006.01) |
| *F02D 41/12* | (2006.01) |
| *F02D 13/02* | (2006.01) |
| *F02D 19/00* | (2006.01) |
| *F02D 41/00* | (2006.01) |

(52) U.S. Cl.
CPC ........... *F02M 21/0287* (2013.01); *F02D 13/02* (2013.01); *F02D 19/00* (2013.01); *F02D 41/0007* (2013.01); *F02D 41/0025* (2013.01); *F02D 41/045* (2013.01); *F02D 41/12* (2013.01); *F02M 21/0215* (2013.01); *F02D 2041/001* (2013.01)

(58) Field of Classification Search
USPC ........ 60/280, 601, 605.1, 605.2, 286, 605.22; 123/295, 432
See application file for complete search history.

(56) References Cited

U.S. PATENT DOCUMENTS

| | | |
|---|---|---|
| 5,370,097 A | 12/1994 | Davis |
| 5,483,941 A | 1/1996 | Cullen et al. |
| 5,553,575 A | 9/1996 | Beck et al. |
| 6,003,478 A | 12/1999 | Huber |
| 6,101,986 A | 8/2000 | Brown et al. |
| 6,694,242 B2 | 2/2004 | Wong |
| 6,901,889 B1 | 6/2005 | Ritter et al. |
| 7,270,089 B2 * | 9/2007 | Wong .................... 123/27 GE |
| 7,444,986 B2 | 11/2008 | Shute |
| 7,627,416 B2 | 12/2009 | Batenburg et al. |

(Continued)

FOREIGN PATENT DOCUMENTS

WO  2011153069  12/2011

OTHER PUBLICATIONS

U.S. Patent and Trademark Office, International Search Report & Written Opinion issued in corresponding Application No. PCT/US2014/070510, mailed Mar. 19, 2015, 10 pp.

*Primary Examiner* — Kenneth Bomberg
*Assistant Examiner* — Dapinder Singh
(74) *Attorney, Agent, or Firm* — Taft & Stettinius & Hollister LLP

(57) ABSTRACT

Systems and methods for controlling operation of dual fuel internal combustion engines in response to a load shedding event are disclosed. The control techniques mitigate the amount of uncombusted gaseous fuel passing into the exhaust and/or aftertreatment system and reduce the rate at which uncombusted gaseous fuel enters the cylinders to reduce engine torque output and/or speed in response to the load shedding event.

30 Claims, 3 Drawing Sheets

(56) References Cited

U.S. PATENT DOCUMENTS

| | | |
|---|---|---|
| 2011/0113774 A1* | 5/2011 | Nunn et al. ................ 60/605.1 |
| 2012/0004824 A1 | 1/2012 | Milton et al. |
| 2012/0222400 A1* | 9/2012 | Walker et al. ................ 60/274 |
| 2012/0292992 A1 | 11/2012 | Williams |
| 2013/0104542 A1* | 5/2013 | Klingbeil ................ 60/605.2 |

* cited by examiner

LOAD SHEDDING TECHNIQUES FOR DUAL FUEL ENGINES

FIELD OF THE INVENTION

The present invention relates generally to dual fuel internal combustion engines, and more particularly is concerned with systems and methods for load shedding for a dual fuel internal combustion engine.

BACKGROUND

A dual fuel engine is an engine that includes a first fuel source that is utilized as the sole fuel source during certain operating conditions and a second fuel source that is integrated with the first fuel source at other operating conditions. In certain applications, the first fuel source is a diesel fuel and the second fuel source is natural gas. The diesel fuel provides, in some cases, the initial, low load levels of operation and is used for ignition for the natural gas at higher load operations. The substitution of natural gas for diesel fuel improves high load performance and emissions reduction, particularly when the engine is employed at locations where natural gas is abundant or available at low cost.

When the engine is operating in dual fuel mode, natural gas is introduced into the intake system. The air-to-natural gas mixture from the intake is drawn into the cylinder, just as it would be in a spark-ignited engine, but typically with a leaner air-to-fuel ratio. Near the end of the compression stroke, diesel fuel is injected, just as it would be in a traditional diesel engine. The diesel fuel ignites, and the diesel combustion causes the natural gas to burn. The dual fuel engine combusts a mixture of air and fuel in the cylinders to produce drive torque. A dual fuel engine can operate either entirely on diesel fuel or on the substitution mixture of diesel and natural gas, but generally cannot operate on natural gas alone except where auxiliary spark equipment is provided to the cylinder.

Dual fuel engines encounter difficulties during operation in response to a load shedding event. While diesel fueling can be readily cut off from the cylinders, the natural gas cannot be cut off as quickly. As a result, uncombusted fuel can enter the exhaust, resulting in possible undesired combustion of the fuel in the exhaust system and/or aftertreatment system. Thus, there remains a need for additional improvements in systems and methods for providing and controlling fuelling in dual fuel engines.

SUMMARY

Unique systems and methods are disclosed for controlling operation of dual fuel engines in response to a load shedding event. A load shedding event occurs when there is a sudden decrease in the load placed on the engine or requested from the engine. Examples of load shedding events include a sudden shutdown of the engine, mechanically disconnecting the engine from the load, for example by disengaging the clutch, where an electrical load on a generator driven by the engine is suddenly reduced, sudden reduction in commanded load, for example by lifting of an accelerator pedal, shifting of the transmission into neutral. The control techniques mitigate or reduce the amount of uncombusted gaseous fuel passing into the exhaust and/or aftertreatment system in response to determination or detection of a load shedding event to minimize unintended energy release in the exhaust system. Unintended energy release in the exhaust system may, for example, increase emissions, damage aftertreatment components, and/or cause unintended combustion that damages exhaust system components. The control techniques can also or alternatively reduce the torque output of the engine in response to determination or detection of a load shedding event. In one form the load shedding event is an indication that the torque demanded from the engine is less than the current torque output by more than a threshold amount. The control techniques further include substantially reducing the flow of the gaseous fuel source to the intake in response to the load shedding event by, for example, terminating the flow or reducing the gaseous fuel flow to a minimum amount, while providing reduced rate of fuelling of the liquid fuel to at least a portion of the plurality of cylinders.

In certain embodiments, the control techniques may further include at least one of: maintaining liquid fuelling in at least a portion of the cylinders to burn-off at least a part of the residual gaseous fuel in the intake system; retarding injection timing of one or more cylinders of the engine to reduce output torque from the engine; closing an intake and/or exhaust throttle to reduce the amount of air/fuel mixture inducted into the engine cylinders and reduce output torque from the engine; opening a compressor bypass in the intake system; opening a wastegate around a turbine of turbocharger to lower boost and engine torque; modulating a variable geometry turbine; selectively terminating fuelling in a portion of the engine cylinders to reduce engine torque; and valve deactivation and/or variable valve actuation control to reduce output torque.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
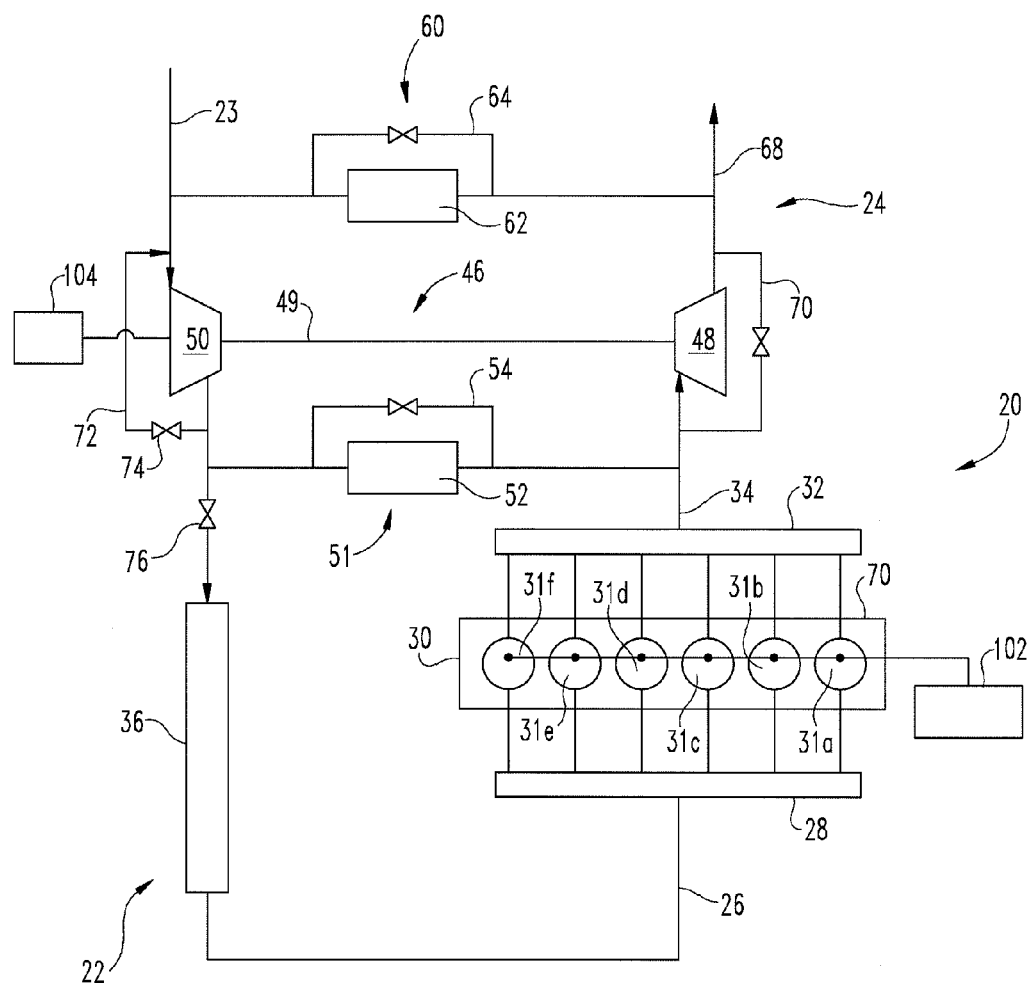
FIG. 1 is a schematic illustration of a portion of an internal combustion engine system with a dual fuel system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 2:
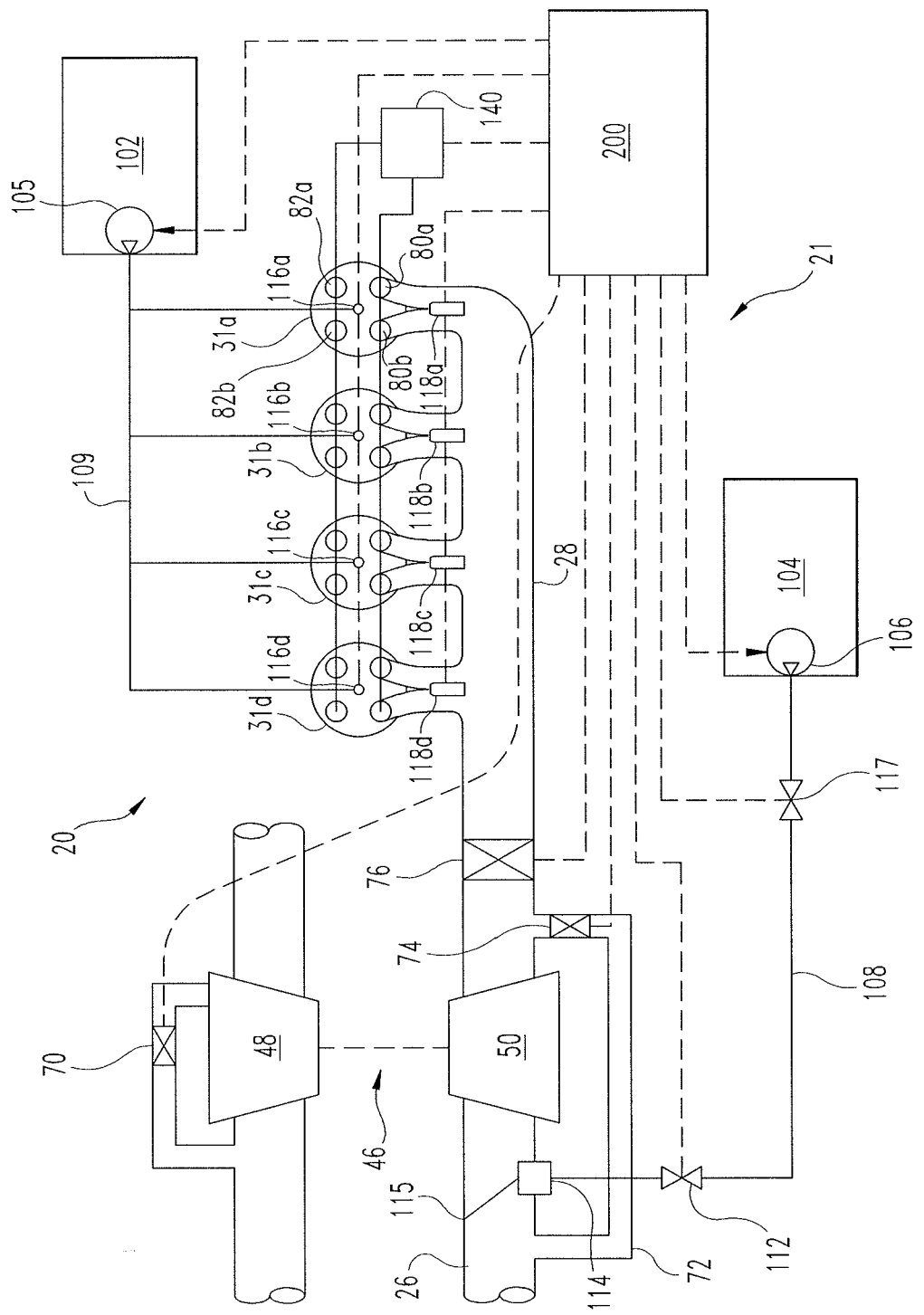
FIG. 2 is another schematic illustration of a part of the internal combustion engine system of FIG. 1 showing various embodiments of a dual fueling system.

With reference to FIGS. 1 and 2, an internal combustion engine system 20 is illustrated in schematic form. A fueling system 21 is also shown in schematic form that is operable with internal combustion engine system 20 to provide fueling for engine 30 from a first fuel source 102 and a second fuel source 104. Internal combustion engine system 20 includes engine 30 connected with an intake system 22 for providing a charge flow to engine 30 and an exhaust system 24 for output of exhaust gases. In certain embodiments, the engine 30 includes a lean combustion engine such as a diesel cycle engine that uses a primary fuel that is a liquid fuel such as diesel fuel and a secondary fuel that is a gaseous fuel such as natural gas. The secondary fuel can be, for example, natural gas, bio-gas, methane, propane, ethanol, producer gas, field gas, liquefied natural gas, compressed natural gas, or landfill gas. However, other types of primary and secondary fuels are not precluded, such as any suitable liquid fuel and gaseous fuel. In the illustrated embodiment, the engine 30 includes six cylinders 31a-31f in an in-line arrangement. However, the number of cylinders (collectively referred to as cylinders 31) may be any number, and the arrangement of cylinders 31 may be any arrangement, and is not limited to the number and arrangement shown in FIG. 1.

Engine 30 includes an engine block 70 that at least partially defines the cylinders 31. A plurality of pistons (not shown) may be slidably disposed within respective cylinders 31 to reciprocate between a top-dead-center position and a bottom-dead-center position. Each of the cylinders 31, its respective piston, and the cylinder head form a combustion chamber. In the illustrated embodiment, engine 30 includes six such combustion chambers. However, it is contemplated that engine 30 may include a greater or lesser number of cylinders and combustion chambers and that cylinders and combustion chambers may be disposed in an "in-line" configuration, a "V" configuration, or in any other suitable configuration.

In one embodiment, engine 30 is a four stroke engine. That is, for each complete engine cycle (i.e., for every two full crankshaft rotations), each piston of each cylinder 31 moves through an intake stroke, a compression stroke, a combustion or power stroke, and an exhaust stroke. Thus, during each complete cycle for the depicted six cylinder engine, there are six strokes during which air is drawn into individual combustion chambers from intake supply conduit 26 and six strokes during which exhaust gas is supplied to exhaust manifold 32.

The engine 30 includes cylinders 31 connected to the intake system 22 to receive a charge flow and connected to exhaust system 24 to release exhaust gases produced by combustion of the primary and/or secondary fuels. Exhaust system 24 may provide exhaust gases to a turbocharger 46, although a turbocharger is not required. In still other embodiments, multiple turbochargers are included to provide high pressure and low pressure turbocharging stages that compress the intake flow.

Furthermore, exhaust system 24 can be connected to intake system 22 with one or both of a high pressure exhaust gas recirculation (EGR) system 51 and a low pressure EGR system 60. EGR systems 51, 60 may include a cooler 52, 62 and bypass 54, 64, respectively. In other embodiments, one or both of EGR systems 51, 60 are not provided. When provided, EGR system(s) 51, 60 provide exhaust gas recirculation to engine 30 in certain operating conditions. In any EGR arrangement during at least certain operating conditions, at least a portion the exhaust output of cylinder(s) 31 is recirculated to the engine intake system 22. In the high pressure EGR system 51, the exhaust gas from the cylinder(s) 31 takes off from exhaust system 24 upstream of turbine 48 of turbocharger 46 and combines with intake flow at a position downstream of compressor 50 of turbocharger 46 and upstream of an intake manifold 28 of engine 30. In the low pressure EGR system 60, the exhaust gas from the cylinder(s) 31a-31f takes off from exhaust system 24 downstream of turbine 48 of turbocharger 46 and combines with intake flow at a position upstream of compressor 50 of turbocharger 46. The recirculated exhaust gas may combine with the intake gases in a mixer (not shown) of intake system 22 or by any other arrangement. In certain embodiments, the recirculated exhaust gas returns to the intake manifold 28 directly.

Intake system 22 includes one or more inlet supply conduits 26 connected to an engine intake manifold 28, which distributes the charge flow to cylinders 31 of engine 30. Exhaust system 24 is also coupled to engine 30 with an engine exhaust manifold 32. Exhaust system 24 includes an exhaust conduit 34 extending from exhaust manifold 32 to an exhaust valve. In the illustrated embodiment, exhaust conduit 34 extends to turbine 48 of turbocharger 46. Turbine 48 includes a valve such as controllable wastegate 70 or other suitable bypass that is operable to selectively bypass at least a portion of the exhaust flow from turbine 48 to reduce boost pressure and engine torque under certain operating conditions. In another embodiment, turbine 48 is a variable geometry turbine with a size-controllable inlet opening. In another embodiment, the exhaust valve is an exhaust throttle that can be closed or opened.

An aftertreatment system (not shown) can be connected with an outlet conduit 68. The aftertreatment system may include, for example, oxidation devices (DOC), particulate removing devices (DPF, CDPF), constituent absorbers or reducers (SCR, AMOX, LNT), reductant systems, and other components if desired.

In one embodiment, exhaust conduit 34 is flow coupled to exhaust manifold 32, and may also include one or more intermediate flow passages, conduits or other structures. Exhaust conduit 34 extends to turbine 48 of turbocharger 46. Turbocharger 46 may be any suitable turbocharger known in the art, including variable-geometry turbine turbochargers and waste-gated turbochargers. Turbocharger 46 may also include multiple turbochargers. Turbine 48 is connected via a shaft 49 to compressor 50 that is flow coupled to inlet supply conduit 26.

Compressor 50 receives fresh air flow from intake air supply conduit 23. Second fuel source 104 may also be flow coupled at or upstream of the inlet to compressor 50 which, as discussed further below, minimizes the amount of uncombusted second fuel in intake conduit 26 when flow from second fuel source 104 is terminated. Intake system 22 further includes a compressor bypass 72 that connects a downstream or outlet side of compressor 50 to an upstream or inlet side of compressor 50. Compressor bypass 72 includes a control valve 74 that is selectively opened to allow charge flow to be returned to the inlet side of compressor 50 to reduce compressor surge under certain operating conditions, such as when an intake throttle 76 is closed. Inlet supply conduit 26 may include a charge air cooler 36 downstream from compressor 50 and intake throttle 76. In another embodiment, a charge air cooler 36 is located in the intake system 22 upstream of intake throttle 76. Charge air cooler 36 may be disposed within inlet air supply conduit 26 between engine 30 and compressor 50, and embody, for example, an air-to-air heat exchanger, an air-to-liquid heat exchanger, or a combination of both to facilitate the transfer of thermal energy to or from the flow directed to engine 30.

In operation of internal combustion engine system 20, fresh air is supplied through inlet air supply conduit 23. The fresh air flow or combined flows can be filtered, unfiltered, and/or conditioned in any known manner, either before or after mixing with the EGR flow from EGR systems 51, 60 when provided. The intake system 22 may include components configured to facilitate or control introduction of the charge flow to engine 30, and may include intake throttle 76, one or more compressors 50, and charge air cooler 36. The intake throttle 76 may be connected upstream or downstream of compressor 50 via a fluid passage and configured to regulate a flow of atmospheric air and/or combined air/EGR flow to engine 30. Compressor 50 may be a fixed or variable geometry compressor configured to receive air or air and fuel mixture from fuel source 104 and compress the air or combined flow to a predetermined pressure level before engine 30. The charge flow is pressurized with compressor 50 and sent through charge air cooler 36 and supplied to engine 30 through intake supply conduit 26 to engine intake manifold 28.

With further reference to FIG. 2, fuel system 21 is configured to provide dual fuelling of engine 30. Fuel system 21 includes first fuel source 102 and second fuel source 104. First fuel source 102 is configured to provide a flow of a first fuel to cylinders 31 with one or more injectors at or near each cylinder. Second fuel source 104 is connected to intake system 22 with a mixer or connection at or adjacent an inlet of compressor 50. In certain embodiments, the cylinders 31 each include at least one direct injector for delivering fuel to the combustion chamber thereof from a primary fuel source, such as first fuel source 102. In addition, at least one or a port injector at each cylinder or a mixer at an inlet of compressor 50 can be provided for delivery or induction of fuel from the second fuel source 104 with the charge flow delivered to cylinders 31.

The fueling from the first fuel source 102 is controlled to provide the sole fueling at certain operating conditions of engine 30, and fueling from the second fuel source 104 is provided to substitute for fueling from the first fuel source 102 at other operating conditions to provide a dual flow of fuel to engine 30. In embodiments where the first fuel source 102 is diesel fuel and the second fuel source 104 is natural gas, a control system including controller 200 is configured to control the flow of liquid diesel fuel from first source 102 and the flow of gaseous fuel from second source 104 in accordance with engine speed, engine loads, intake manifold pressures, and fuel pressures, for example.

A direct injector, as utilized herein, includes any fuel injection device that injects fuel directly into the cylinder volume, and is capable of delivering fuel into the cylinder volume when the intake valve(s) and exhaust valve(s) are closed. The direct injector may be structured to inject fuel at the top of the cylinder or laterally of the cylinder. In certain embodiments, the direct injector may be structured to inject fuel into a combustion pre-chamber. Each cylinder 31, such as the illustrated cylinders 31*a*-*d* in FIG. 2 (cylinders 31*e* and 31*f* omitted for brevity, it being understood that any cylinder arrangement and number as discussed herein is contemplated) may include one or more direct injectors 116*a*-116*d*, respectively. The direct injectors 116*a*-116*d* may be the primary fueling device for first fuel source 102 for the cylinders 31*a*-31*d*.

A port injector, as utilized herein, includes any fuel injection device that injects fuel outside the engine cylinder in the intake manifold to form the air-fuel mixture. The port injector injects the fuel towards the intake valve. During the intake stroke, the downwards moving piston draws in the air/fuel mixture past the open intake valve and into the combustion chamber. Each cylinder 31 may include one or more port injectors 118*a*-118*d*, respectively. In one embodiment, the port injectors 118*a*-118*d* may be the primary fueling device for second fuel source 104 to the cylinders 31*a*-31*d*. In another embodiment, the second fuel source 104 can be connected to intake system 22 with a mixer 115 at a natural gas connection 114 upstream of intake manifold 28, such as at the inlet or upstream of compressor 50.

In certain embodiments, each cylinder 31 includes at least one direct injector that is capable of providing all of the designed primary fueling amount from first fuel source 102 for the cylinders 31 at any operating condition. Second fuel source 104 provides a flow of a second fuel to each cylinder 31 through a port injector or a natural gas connection upstream of intake manifold 28 to provide a second fuel flow to the cylinders 31 to achieve desired operational outcomes, such as improved efficiency, improved fuel economy, improved high load operation, and other outcomes.

One embodiment of system 20 includes fuel system 21 with at least one fuel source 102 to provide a primary fuel flow to all the cylinders 31 and a second fuel source 104 that provides a second fuel flow to all the cylinders 31 in addition to the primary fuel flow under certain operating conditions. First fuel source 102 includes a first fuel pump 105 that is connected to controller 200, and the second fuel source 104 includes, in one embodiment, a second fuel pump 106 that is connected to controller 200. Each of the cylinders 31 includes an injector, such as direct injectors 116*a*-116*d* associated with each of the illustrated cylinders 31*a*-31*d* of FIG. 2. Direct injectors 116*a*-116*d* are electrically connected with controller 200 to receive fueling commands that provide a fuel flow to the respective cylinder 31 in accordance with a fuel command determined according to engine operating conditions and operator demand by reference to fueling maps, control algorithms, or other fueling rate/amount determination source stored in controller 200. First fuel pump 105 is connected to each of the direct injectors 116*a*-116*d* with a first fuel line 109. First fuel pump 105 is operable to provide a first fuel flow from first fuel source 102 to each of the cylinders 31*a*-31*d* in a rate, amount and timing determined by controller 200 that achieves a desired torque and exhaust output from cylinders 31.

Second fuel pump 106 is connected to the inlet of compressor 50 with natural gas connection 114 with a second fuel line 108 or to port injectors 118. A shutoff valve 112 can be provided in fuel line 108 and/or at one or more other locations in fuel system 21 that is connected to controller 200. Second fuel pump 106 is operable to provide a second fuel flow from second fuel source 104 in an amount determined by controller 200 that achieves a desired torque and exhaust output from cylinders 31. A flow control valve 117 can be provided to control the flow of gaseous fuel to engine 30 from second fuel source 104. In another embodiment, second fuel pump 106 is omitted and fuel is supplied to connection 114 or port injectors 118 under pressure from a pressurized second fuel source 104.

System 20 can further include a variable valve actuation mechanism 140 connected to intake valves 80*a*, 80*b* of at least one of the cylinders 31 and to exhaust valves 82*a*, 82*b* of at least one of the cylinders 31. Variable valve actuation mechanism 140 can include, for example, a cam phaser and/or a cam shaft. Variable valve actuation mechanism 140 is operable to control the lift profile of the intake valves 80*a*, 80*b* and/or intake valves 82*a*, 82*b* relative to the crank angle. As used herein, changing the lift profile includes any one or combination of changing a timing of the lift profile, changing a duration of the lift profile, changing an amplitude of the lift profile, and deactivating at least one of the intake valves and exhaust valves.

Controller 200 can be connected to actuators, switches, or other devices associated with fuel pumps 105, 106, shutoff valve 112, flow control valve 117, intake throttle 76, compressor bypass valve 74, wastegate 70 or an inlet to a VGT or an exhaust throttle, variable valve actuation mechanism 140, and/or injectors 116, 118 and configured to provide control commands thereto that regulate the amount, timing and duration of the flows of the first and second fuels to cylinders 31, the charge flow, and the exhaust flow to provide the desired torque and exhaust output. In addition, controller 200 can be connected to engine 30 and configured to detect a load shedding event associated with engine 30 during operation of engine 30. A load shedding event can be detected by, for example, a threshold reduction in load applied to engine 30, a threshold reduction in power demanded from engine 30, a threshold reduction in torque in an output shaft connected to engine, and/or a threshold or sudden increase in engine speed or the engine speed. The threshold reduction in applied load, demanded power, torque reduction and/or threshold engine speed increase or rate of engine speed increase indicating a load shedding event can correspond to variances from nominal values that are encountered during typical, normal or expected operation of the engine 30.

As discussed above, the positioning of each of shutoff valve 112, flow control valve 117, intake throttle 76, compressor bypass valve 74, wastegate 70 and/or injectors 116, 118 and the on/off status of fuel pumps 105, 106 can be controlled via control commands from controller 200. In certain embodiments of the systems disclosed herein, controller 200 is structured to perform certain operations to control engine operations and fueling of cylinders 31 with fueling system 21 to provide the desired speed and torque outputs. In certain embodiments, the controller 200 forms a portion of a processing subsystem including one or more computing devices having memory, processing, and communication hardware. The controller 200 may be a single device or a distributed device, and the functions of the controller 200 may be performed by hardware or software. The controller 200 may be included within, partially included within, or completely separated from an engine controller (not shown). The controller 200 is in communication with any sensor or actuator throughout the systems disclosed herein, including through direct communication, communication over a datalink, and/or through communication with other controllers or portions of the processing subsystem that provide sensor and/or actuator information to the controller 200.

Certain operations described herein include operations to determine one or more parameters. Determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the parameter can be calculated, and/or by referencing a default value that is the parameter value.

The schematic flow description which follows provides an illustrative embodiment of a method for providing a response to a load shedding event during a dual fuelling mode of operation of internal combustion engine system 20. As used herein, a dual fuel system 21 is a fueling system in which a dual fueling mode is provided where each of the cylinders 31 of engine 30 receives a first fuel flow and a second fuel flow in addition to the first fuel flow under certain operating conditions. However, it is contemplated that the dual fueling system 21 can be operated in a single fuel mode from first fuel source 102 upon operator selection or certain operating conditions. Operations illustrated are understood to be exemplary only, and operations may be combined or divided, and added or removed, as well as re-ordered in whole or part, unless stated explicitly to the contrary herein. Certain operations illustrated may be implemented by a computer such as controller 200 executing a computer program product on a non-transient computer readable storage medium, where the computer program product comprises instructions causing the computer to execute one or more of the operations, or to issue commands to other devices to execute one or more of the operations.

Figure 3:
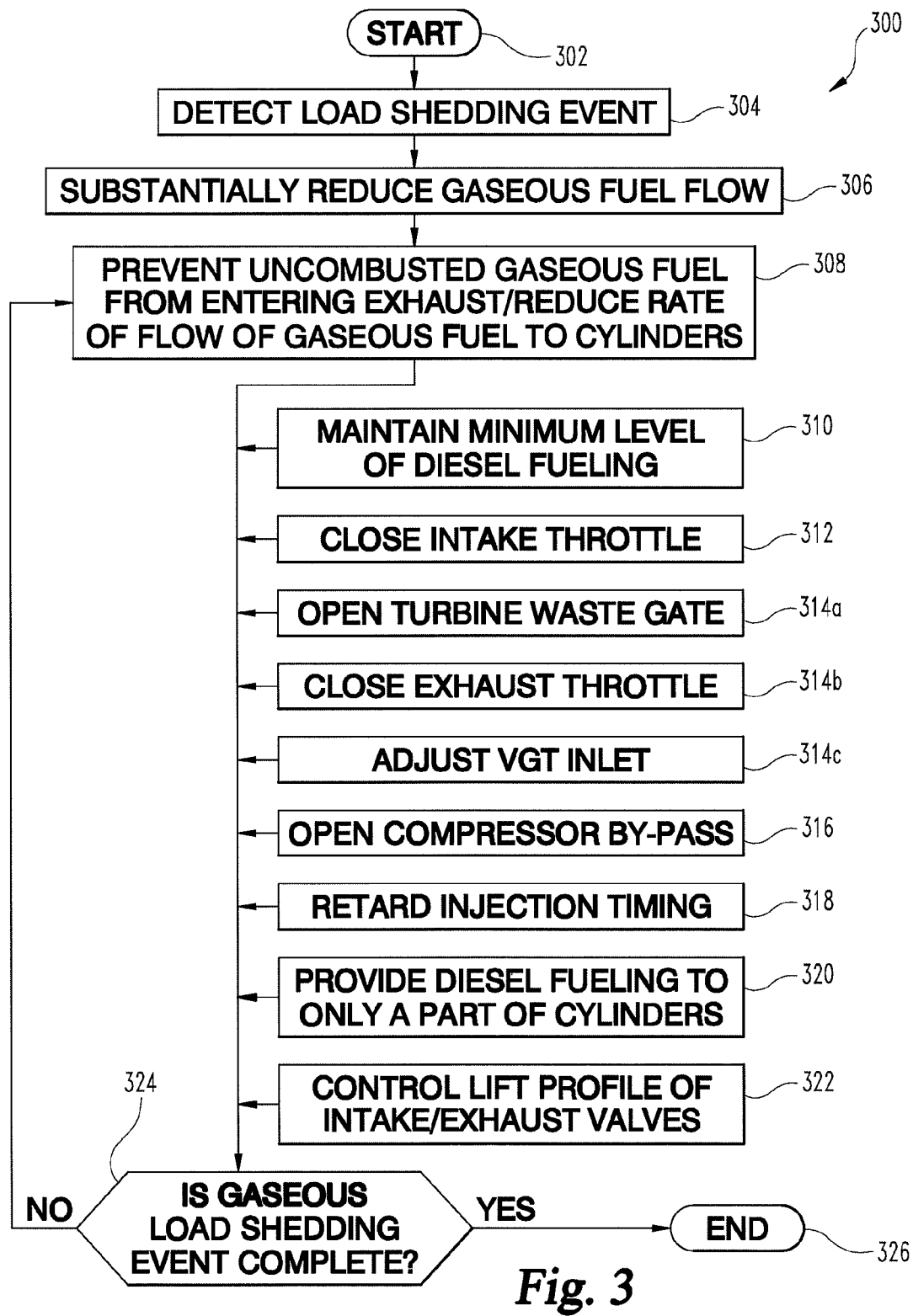
FIG. 3 is a flow diagram of procedures for controlling operation of a dual fuel engine in response to a load shedding event.

In FIG. 3, one embodiment of a flow diagram for operating engine 30 with dual fuel system 21 in response to a load shedding event is disclosed. Procedure 300 starts at 302 upon, for example, starting of engine 30. At operation 304 the operating conditions of engine 30 are determined to detect a load shedding event. The engine operating conditions that can indicate a load shedding event can include, for example, a reduction in an engine torque request, an engine torque output by more than a threshold amount, or a sudden speed increase of engine 30, any of which that vary from a nominal expected amount based on current operating conditions. Other engine operating conditions that can indicate a load shedding event can include, for example, emergency shutdown conditions, an operator input, an accelerator pedal position, a transmission status, and a clutch position.

Based on the detection of the load shedding event at operation 304, procedure 300 continues at operation 306 in which the gaseous fuel supply from second fuel source 104 is substantially reduced by, for example, closing or substantially closing a shut-off valve so that the amount of gaseous fuel supplied is zero or a minimal amount that does provide a desired torque reduction in response to the load shedding event. Substantially reducing the gaseous fuel flow can include, for example, terminating operation of gaseous fuel pump 106 and/or closing shut-off valve 112. In one embodiment, shut-off valve 112 is located at or adjacent the connection of fuel line 108 with the inlet of compressor 50 to reduce the uncombusted amount of gaseous fuel in intake system 22 when the gaseous fuel supply is substantially reduced.

Once the flow of gaseous fuel from second fuel source 104 is substantially reduced at operation 306, procedure 300 continues at operation 308 in which an operation is completed to prevent uncombusted gaseous fuel in the intake system 22 that remains in the intake system, for example, between compressor 50 and cylinders 31, from entering the exhaust system. Operation 308 additionally or alternatively includes an operation to reduce a rate at which the flow of uncombusted gaseous fuel enters cylinders 31. Operation 308 can include any one or combination of operations 310, 312, 314a, 314b, 314c, 316, 318, 320, 322 to prevent or reduce the amount of uncombusted gaseous fuel in intake system 22 from entering the exhaust system and/or to reduce the rate at which the uncombusted gaseous fuel enters the cylinders 31 to reduce engine output torque, preventing a possible speed overshoot by engine 30 in response to the load shedding event.

Operation 310 includes dropping the diesel fuelling rate from a first rate of fuelling provided just prior to the load shedding event to a second, lower rate to compensate for the increase in engine speed when the load shedding event occurs. Preventing the diesel fuelling from being stopped completely in response to the load shedding event maintains a minimum level of diesel fuelling from first fuel source 102 during the load shedding event. The elimination of diesel fuelling eliminates a source for igniting and combusting uncombusted gaseous fuel in intake system 22. By maintaining a minimum level of fuelling into cylinders 31 from first fuel source 102 sufficient to create a combustion event in cylinders 31, at least a portion of the remaining gaseous fuel in intake system 21 can be combusted in cylinders 31 during the load shedding event, preventing or eliminating uncombusted gaseous fuel from entering exhaust system 24 and/or the aftertreatment system.

Additionally or alternatively, procedure 300 includes an operation 312 to close intake throttle 76 to reduce the charge flow and allow a rapid reduction in torque of engine 30 by reducing the amount or rate at which of uncombusted gaseous fuel in the air/fuel mixture, i.e. the charge flow, is inducted into cylinders 31. Operation 312 can be accompanied by an operation 314a to open the wastegate 70 of turbine 49 to further lower boost pressures and torque produced by engine 30, reducing the torque output of engine 30. In another embodiment, an operation 314b includes closing an exhaust throttle to reduce the rate at which uncombusted gaseous fuel enters the cylinder. Closing the exhaust throttle also reduces the torque produced by the engine. In yet another embodiment, operation 314c includes adjusting an inlet of a variable geometry turbine in the exhaust system in response to detection of the load shedding event to reduce the rate at which uncombusted gaseous fuel enters the cylinders and the torque output of engine 30. Operations 314a, 314b, 314c can be performed in response to detection of the load shedding event with or without closing of intake throttle 76. In a further embodiment, operation 312 can be accompanied by operation 316 to open bypass valve 74 of compressor bypass 72 to return at least a portion of the charge flow to the compressor inlet, avoiding compressor surge and lowering the torque produced by the engine.

Additionally or alternatively, procedure 300 includes an operation 318 to retard the injection timing of diesel fuel into cylinders 31, which decreases the efficiency of the combustion event to reduce engine torque output. Procedure 300 may further include an operation 320 to provide or inject diesel fuel from first fuel source 102 to only a portion of cylinders 31. For example, every other cylinders 31 in the firing order is fuelled while the remaining cylinders 31 are not. As a result, slugs of exhaust product from the diesel fuelled cylinders 31 are separated by slugs of uncombusted gaseous fuel from the non-diesel fuelled engine. While some combustion of gaseous fuel in the exhaust may still result, operation 320 prevents the propagation of a wave of uncombusted gaseous fuel in the exhaust system since the slugs of exhaust product act as a buffer through which the slugs of uncombusted gaseous fuel do not pass in the exhaust system.

Additionally or alternatively, procedure 300 includes an operation 322 to change the lift profile of the exhaust valves and/or intake valves of one or more of cylinders 31 to reduce the rate at which uncombusted gaseous fuel enters the cylinders. Changing the lift profile can include, for example, changing one or more of the timing, duration, and/or amplitude of the lift profile of at least one of the exhaust valves and the intake valves of the cylinder 31. In particular, reducing the lift and/or reducing the duration of the intake and/or exhaust valve opening event can be used to reduce the rate at which uncombusted gaseous fuel enters the cylinder and to reduce the torque produced by the engine. In addition, changing the lift profile can include deactivation of one or more of the intake valves and/or exhaust valves of one or more cylinders 31.

Procedure 300 continues at conditional 324 to determine if the load shedding event is complete. If conditional 324 is negative procedure 300 returns to operation 308 and continues as discussed above. If the load shedding event is complete, procedure 300 ends at 326 and continues with normal operation of system 20.

Various aspects of the systems and methods disclosed herein are contemplated. For example, one aspect relates to a method that includes operating an internal combustion engine system. The internal combustion engine system includes an intake system connected to an engine with at least one cylinder and at least two fuel sources operably connected to the internal combustion engine system to provide a liquid fuel at a first rate to the at least one cylinder and a flow of a gaseous fuel to the engine to produce a torque output. The intake system is coupled to the at least one cylinder to provide a charge flow from the intake system to a combustion chamber of the at least one cylinder and an exhaust system. The method further includes determining a load shedding event associated with the internal combustion engine and, in response to determining the load shedding event, reducing the first rate of the liquid fuel to the at least one cylinder and substantially reducing the flow of the gaseous fuel to the engine, where an uncombusted amount of gaseous fuel remains in the intake system after substantially reducing the flow. The method further includes at least one of preventing at least a portion of the uncombusted amount of the gaseous fuel from entering the exhaust system to minimize unintended energy release in the exhaust system and reducing the rate at which uncombusted fuel enters the at least one cylinder to reduce a torque output of the internal combustion engine.

According to another aspect, a system is disclosed that includes an internal combustion engine including a plurality of cylinders, an exhaust system configured to receive exhaust from the plurality of cylinders, and an intake system configured to direct a charge flow to the plurality of cylinders. The intake system includes a compressor for compressing the charge flow. The system further includes a fuel system with a first fuel source operable to provide a liquid fuel to the plurality of cylinders and a second fuel source operable to provide a gaseous fuel to an inlet of the compressor for compression with the charge flow. The system also includes a controller connected to the engine, the first fuel source, and the second fuel source. The controller is configured to determine a load shedding event associated with the engine while the engine is fuelled with the liquid fuel at a first rate simultaneously with the gaseous fuel in the charge flow and, in response to the load shedding event, to reduce the first rate of the liquid fuel to the plurality of cylinders and to substantially reduce a flow of the gaseous fuel to the intake system. In one aspect, the controller is further configured to prevent an uncombusted amount of the gaseous fuel remaining in the intake system from reaching the exhaust system to minimize unintended energy release in the exhaust system. In another aspect, the controller is configured to reduce the rate at which the uncombusted amount of fuel enters the cylinders to reduce the torque output of the engine.

Various embodiments of the systems and methods are contemplated for preventing the uncombusted amount of the gaseous fuel in the intake system from entering the exhaust system and/or reducing the rate at which the uncombusted amount of gaseous fuels enters the cylinders to reduce engine output torque. In one embodiment, liquid fuel is provided to at least a portion of the plurality of cylinders at a second rate sufficient to combust the uncombusted amount of gaseous fuel in the intake system that flows to the plurality of cylinders to prevent at least a portion of the uncombusted fuel from entering the exhaust system. In a further embodiment, the engine output torque is also reduced by the liquid fuel not being provided to a first portion of the plurality of cylinders while the liquid fuel is provided to a second portion of the plurality of cylinders. In yet another embodiment, an injection timing of the liquid fuel is retarded into at least a portion of the plurality of cylinders to reduce engine output torque.

In another embodiment, the rate at which the uncombusted gaseous fuel enters the cylinders is controlled to reduce engine output torque. In one embodiment, a wastegate of a turbine in the exhaust system is opened or an inlet to a variable geometry turbine is adjusted to lower a boost pressure of the intake system. In another embodiment, a throttle valve is closed in the intake system and/or an exhaust valve is closed in the exhaust system. In a further embodiment, a compressor bypass valve is opened in a compressor bypass downstream of the compressor to limit compressor surge after closing the throttle valve. In a further embodiment, a lift profile of at least one of a cylinder intake valve and a cylinder exhaust valve is changed. In a refinement of this embodiment, changing the lift profile includes at least one of deactivating the cylinder intake valve and deactivating the cylinder exhaust valve.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   operating an internal combustion engine system including an intake system connected to an engine with at least one cylinder and at least two fuel sources operably connected to the internal combustion engine system to provide a liquid fuel at a first rate to the at least one cylinder and a flow of a gaseous fuel to the engine to produce a torque output, wherein the intake system is coupled to the at least one cylinder to provide a charge flow from the intake system to a combustion chamber of the at least one cylinder, the internal combustion engine system further including an exhaust system;
   determining, with a controller connected to the internal combustion engine and the at least two sources, a load shedding event associated with the internal combustion engine;
   in response to determining the load shedding event:
      reducing the first rate of the liquid fuel to the at least one cylinder;
      reducing the flow of the gaseous fuel to the engine, wherein an uncombusted amount of gaseous fuel remains in the intake system after reducing the flow; and
      preventing at least a portion of the uncombusted amount of the gaseous fuel from entering the exhaust system to minimize unintended energy release in the exhaust system.

2. The method of claim 1, wherein the liquid fuel is diesel fuel and the gaseous fuel is natural gas.

3. The method of claim 1, wherein the at least one cylinder includes a plurality of cylinders and preventing at least the portion of the uncombusted amount from entering the exhaust system includes providing the liquid fuel to at least a portion of the plurality of cylinders at a second rate sufficient to combust the portion of the uncombusted amount of gaseous fuel in the portion of the plurality of cylinders.

4. The method of claim 3, wherein providing the liquid fuel to at least the portion of the plurality cylinders includes terminating providing the liquid fuel to a first portion of the plurality of cylinders while providing the liquid fuel to a second portion of the plurality of cylinders.

5. The method of claim 1, further comprising, in response to determining the load shedding event, reducing a rate at which the uncombusted amount of gaseous fuel enters the at least one cylinder to reduce the torque output of the internal combustion engine.

6. The method of claim 5, wherein reducing the rate at which uncombusted fuel enters the at least one cylinder includes at least one of opening a valve in the exhaust system to lower a boost pressure of the intake system and closing an exhaust throttle in the exhaust system.

7. The method of claim 6, wherein opening the valve includes opening a wastegate of a turbine.

8. The method of claim 5, wherein reducing the rate at which uncombusted fuel enters the at least one cylinder includes closing a throttle valve in the intake system.

9. The method of claim 5, wherein reducing the rate at which uncombusted fuel enters the at least one cylinder includes opening a compressor bypass downstream of the compressor to lower a boost pressure of the intake system.

10. The method of claim 5, wherein reducing the rate at which uncombusted fuel enters the at least one cylinder includes adjusting an inlet to a variable geometry turbine in the exhaust system.

11. The method of claim 5, further comprising retarding an injection timing of the liquid fuel into at least a portion of the plurality of cylinders to reduce the torque output of the engine.

12. The method of claim 5, wherein reducing the rate at which uncombusted fuel enters the at least one cylinder includes changing a lift profile of at least one of a cylinder intake valve and a cylinder exhaust valve.

13. The method of claim 12, wherein changing the lift profile includes at least one of reducing a lift and a duration of a valve opening event and changing a phasing of the valve opening event of the at least one of the cylinder intake valve and the cylinder exhaust valve.

14. The method of claim 12, wherein changing the lift profile includes at least one of deactivating the cylinder intake valve and deactivating the cylinder exhaust valve.

15. A method, comprising:
   operating an internal combustion engine system including an intake system connected to an engine with at least one cylinder and at least two fuel sources operably connected to the internal combustion engine system to provide a liquid fuel at a first rate to the at least one cylinder and a flow of a gaseous fuel to the engine, wherein the intake system is coupled to the at least one cylinder to provide a charge flow from the intake system to a combustion chamber of the at least one cylinder, the internal combustion engine system further including an exhaust system;
   determining, with a controller connected to the internal combustion engine and the at least two sources, a load shedding event associated with the internal combustion engine;
   in response to determining the load shedding event:
      reducing the first rate of the liquid fuel to the at least one cylinder;
      reducing the flow of the gaseous fuel to the engine in response to determining the load shedding event, wherein an uncombusted amount of gaseous fuel remains in the intake system after reducing the flow; and reducing a rate at which uncombusted fuel enters the at least one cylinder to reduce a torque output of the internal combustion engine.

16. The method of claim 15, further comprising, in response to determining the load shedding event, preventing at least a portion of the uncombusted amount from entering the exhaust system to minimize unintended energy release in the exhaust system.

17. A system, comprising:
an internal combustion engine including a plurality of cylinders;
an exhaust system configured to receive exhaust from the plurality of cylinders;
an intake system configured to direct a charge flow to the plurality of cylinders;
a fuel system including a first fuel source operable to provide a liquid fuel to the plurality of cylinders and a second fuel source operable to provide a gaseous fuel upstream of the cylinders in the charge flow; and
a controller connected to the engine, the first fuel source, and the second fuel source, wherein the controller is configured to determine a load shedding event associated with the engine while the engine is fuelled with the liquid fuel at a first rate simultaneously with the gaseous fuel in the charge flow to produce a torque output and, in response to the load shedding event, to reduce the first rate of the liquid fuel to the plurality of cylinders and reduce a flow of the gaseous fuel to the intake system, and wherein the controller is further configured to prevent a portion of an uncombusted amount of gaseous fuel from entering the exhaust system to minimize unintended energy release in the exhaust system.

18. The system of claim 17, wherein the liquid fuel is diesel fuel and the gaseous fuel is natural gas.

19. The system of claim 17, wherein the controller is configured to prevent the portion of the uncombusted amount of gaseous fuel from entering the exhaust system by controlling a flow of the liquid fuel to at least a portion of the plurality of cylinders at a second rate that is less than the first rate, the second rate being sufficient to combust at least part of the portion of the uncombusted amount of gaseous fuel.

20. The system of claim 19, wherein, in response to the load shedding event, the controller is further configured to terminate the flow of liquid fuel to a first portion of the plurality of cylinders while providing the flow of liquid fuel to a second portion of the plurality of cylinders at the second rate.

21. The system of claim 17, wherein, in response to the load shedding event, the controller is configured to reduce the torque output of the engine and reduce a rate at which the uncombusted amount of gaseous fuel enters the cylinders by one of opening a valve of a turbocharger to lower a boost pressure of the intake system and closing an exhaust throttle.

22. The system of claim 21, wherein the valve is a wastegate of a turbine in the exhaust system.

23. The system of claim 17, wherein the intake system includes a throttle valve and, in response to the load shedding event, the controller is further configured to reduce the torque output of the engine by closing the throttle valve to reduce a rate at which the uncombusted amount of gaseous fuel enters the cylinders.

24. The system of claim 17, wherein the intake system includes a compressor for compressing the charge flow, and wherein the system includes a compressor bypass connecting the intake system at a downstream side of the compressor to an upstream side of the compressor and, in response to the load shedding event, the controller is further configured to open a bypass valve in the compressor bypass to lower a boost pressure of the intake system.

25. The system of claim 17, wherein, in response to the load shedding event, the controller is configured to reduce the torque output of the engine by retarding an injection timing of the liquid fuel into at least a portion of the plurality of cylinders.

26. The system of claim 17, wherein, in response to the load shedding event, the controller is configured to reduce the torque output of the engine by adjusting an inlet to a variable geometry turbine in the exhaust system.

27. The system of claim 17, wherein the controller is configured to reduce a rate at which uncombusted fuel enters at least one cylinder by changing a lift profile of at least one of an exhaust valve and an intake valve of the at least one cylinder.

28. The system of claim 27, wherein changing the lift profile includes at least one of deactivating the cylinder intake valve and deactivating the cylinder exhaust valve.

29. A system, comprising:
an internal combustion engine including a plurality of cylinders;
an exhaust system configured to receive exhaust from the plurality of cylinders;
an intake system configured to direct a charge flow to the plurality of cylinders;
a fuel system including a first fuel source operable to provide a liquid fuel to the plurality of cylinders and a second fuel source operable to provide a gaseous fuel upstream of the cylinders in the charge flow; and
a controller connected to the engine, the first fuel source, and the second fuel source, wherein the controller is configured to determine a load shedding event associated with the engine while the engine is fuelled with the liquid fuel at a first rate simultaneously with the gaseous fuel in the charge flow to produce a torque output and, in response to the load shedding event, to reduce the first rate of the liquid fuel to the plurality of cylinders and to reduce a flow of the gaseous fuel to the intake system, wherein the controller is further configured to reduce the torque output of the engine by reducing a rate at which an uncombusted amount of the gaseous fuel remaining in the intake system enters the plurality of cylinders.

30. The system of claim 29, wherein, in response to the load shedding event, the controller is further configured to reduce the uncombusted amount of the gaseous fuel remaining in the intake system from entering the exhaust system to minimize unintended energy release in the exhaust system.

* * * * *